United States Patent
Tsai

(10) Patent No.: US 8,681,301 B2
(45) Date of Patent: Mar. 25, 2014

(54) LIQUID CRYSTAL ON SILICON DISPLAY PANEL AND METHOD FOR MANUFACTURING THE SAME

(75) Inventor: Ching-Huei Tsai, Hsinchu (TW)

(73) Assignee: United Microelectronics Corporation, Hsinchu (TW)

( * ) Notice: Subject to any disclaimer, the term of this patent is extended or adjusted under 35 U.S.C. 154(b) by 47 days.

(21) Appl. No.: 13/428,019

(22) Filed: Mar. 23, 2012

(65) Prior Publication Data

US 2013/0250219 A1   Sep. 26, 2013

(51) Int. Cl.
*G02F 1/1345* (2006.01)
*G02F 1/136* (2006.01)

(52) U.S. Cl.
USPC ........... 349/137; 349/138; 349/149; 349/158; 349/187; 438/30

(58) Field of Classification Search
USPC ......... 349/113, 122, 137, 138, 149, 151, 152, 349/187; 257/59, 72; 345/87, 92; 438/30
See application file for complete search history.

(56) References Cited

U.S. PATENT DOCUMENTS

| | | | |
|---|---|---|---|
| 7,433,011 B2 * | 10/2008 | Liao | 349/153 |
| 2002/0085158 A1 * | 7/2002 | Armagost et al. | 349/149 |
| 2004/0046911 A1 * | 3/2004 | McKnight | 349/113 |
| 2004/0095540 A1 * | 5/2004 | Iwasa et al. | 349/137 |
| 2006/0055857 A1 | 3/2006 | Hsieh et al. | |
| 2006/0072063 A1 * | 4/2006 | Kim et al. | 349/156 |
| 2007/0152249 A1 * | 7/2007 | Lim | 257/292 |

\* cited by examiner

*Primary Examiner* — Dung Nguyen
*Assistant Examiner* — Tai Duong
(74) *Attorney, Agent, or Firm* — WPAT, PC; Justin King

(57) ABSTRACT

A liquid crystal on silicon display panel and a method for manufacturing the same are disclosed. The method includes the following steps. First, a semiconductor substrate having a pixel region with at least one first top metal pattern and a first anti-reflection coating structure substantially disposed thereon and a circuit region with is at least one second top metal pattern and a second anti-reflection coating structure substantially disposed thereon is provided. Moreover, the circuit region surrounds the pixel region. Next, the first anti-reflection coating structure is removed. Afterward, a dielectric layer is formed on the semiconductor substrate and covering the first top metal pattern. Then, a passivation layer is formed on the dielectric layer. After that, a portion of the passivation layer and a portion of the second anti-reflection coating structure thereunder are removed to form an opening exposing a portion of the second top metal pattern.

12 Claims, 6 Drawing Sheets

LIQUID CRYSTAL ON SILICON DISPLAY PANEL AND METHOD FOR MANUFACTURING THE SAME

FIELD OF THE INVENTION

The present invention relates to a liquid crystal display panel and a method for manufacturing the same, and more particularly to a liquid crystal on silicon display panel and a method for manufacturing the same.

BACKGROUND OF THE INVENTION

Nowadays, various kinds of digital projector are commercially available, such as liquid crystal display (LCD) projectors, digital light processing (DLP) projectors, and liquid crystal on silicon (LCOS) projectors. Since the transistors are used in LCOS projectors for controlling liquid crystal layer as that in LCD projectors and the mirrors are used in LCOS projectors for reflecting light as that in DLP projectors, LCOS projectors have advantages of high resolution, high brightness and low production cost. Accordingly, LCOS projectors become the main technique of the reflective projectors.

In LCOS projectors, the light is reflected from a LCOS panel for projecting images, so that the reflectivity of the pixel region of the LCOS panel is very important. However, in conventional LCOS projector, the contrast of the projected image would be decreased by interference from the light reflected from non-pixel region of LCOS panel.

Therefore, the liquid crystal on silicon display panel and the method for manufacturing the same are necessary to improve for increasing the quality of image projected from the LCOS projector.

SUMMARY OF THE INVENTION

Accordingly, the invention is directed to a method for manufacturing a liquid crystal on silicon display panel to manufacture a liquid crystal on silicon display panel with improved image projecting quality.

The invention is also directed to a liquid crystal on silicon display panel to reduce the reflectivity of the circuit region and improve the image projecting quality.

In accordance with an aspect, the present invention provides a method for manufacturing a liquid crystal on silicon display panel including the following steps. First, a semiconductor substrate having a pixel region and a circuit region is provided. The circuit region surrounds the pixel region. At least one first top metal pattern and a first anti-reflection coating structure disposed thereon have been formed in the pixel region, and at least one second top metal pattern and a second anti-reflection coating structure disposed thereon have been formed in the circuit region. Next, the first anti-reflection coating structure is removed. Afterward, a dielectric layer is formed on the semiconductor substrate and covering the first top metal pattern. Then, a passivation layer is formed on the dielectric layer. After that, a portion of the passivation layer and a portion of the second anti-reflection coating structure thereunder are removed to form an opening exposing a portion of the second top metal pattern.

In one embodiment of the invention, the material of the first top metal pattern includes reflective metal.

In one embodiment of the invention, the method for forming the first top metal pattern, the second top metal pattern, the first anti-reflection coating structure and the second anti-reflection coating structure includes the following steps. First, a metal layer is formed on the semiconductor substrate. Next, an anti-reflection coating layer is formed on the metal layer. Then, the metal layer and the anti-reflection coating layer are patterned to form the first top metal pattern and the first anti-reflection coating structure within the pixel region and form the second top metal pattern and the second anti-reflection coating structure within the circuit region.

In one embodiment of the invention, the second anti-reflection coating structure is single-layer structure or multi-layer structure. For example, the materials of the second anti-reflection coating structure may be titanium nitride (TiN), titanium nitride/titanium (TiN/Ti), titanium nitride/silicon oxynitride (TiN/SiON), titanium nitride/titanium/silicon oxynitride (TiN/Ti/SiON) or silicon dioxide/silicon oxynitride (SiO$_2$/SiON).

In one embodiment of the invention, the method for manufacturing the liquid crystal on silicon display panel further includes the step of forming at least one conductive wire within the opening, and the conductive wire is electrically connected with the second top metal pattern.

The invention also provides a liquid crystal on silicon display panel including a semiconductor substrate, at least one first top metal pattern, at least one anti-reflection structure, a dielectric layer, a passivation layer, a at least one second top metal pattern, a transparent substrate and a liquid crystal layer. The semiconductor substrate has a pixel region and a circuit region surrounding the pixel region. The first top metal pattern is disposed on the semiconductor substrate and within the pixel region. The second top metal pattern is disposed on the semiconductor substrate and within the circuit region. The anti-reflection structure is disposed on the second top metal pattern and has a first opening exposing a portion of the second top metal pattern. The dielectric layer is disposed on the semiconductor substrate and covers the first top metal pattern so as to directly contact to the top surface of the first top metal pattern. The passivation layer is disposed on the dielectric layer and has a second opening corresponding to the first opening. The transparent substrate is disposed above the semiconductor substrate, and the liquid crystal layer is disposed between the transparent substrate and the semiconductor substrate.

In one embodiment of the invention, the material of the first top metal pattern includes reflective metal.

In one embodiment of the invention, the second anti-reflection coating structure is single-layer structure or multi-layer structure. For example, the materials of the second anti-reflection coating structure may be titanium nitride (TiN), titanium nitride/titanium (TiN/Ti), titanium nitride/silicon oxynitride (TiN/SiON), titanium nitride/titanium/silicon oxynitride (TiN/Ti/SiON) or silicon dioxide/silicon oxynitride (SiO$_2$/SiON).

In one embodiment of the invention, the liquid crystal on silicon display panel further includes at least one conductive wire disposed within the opening and electrically connecting to second top metal pattern.

In the method for manufacturing a liquid crystal on silicon display panel of the invention, the anti-reflection structure is formed on the second top metal pattern formed in the circuit region for reducing the light reflected from the second top metal pattern within the circuit region. Therefore, the contrast of the image projected from the liquid crystal on silicon display panel can be improved.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
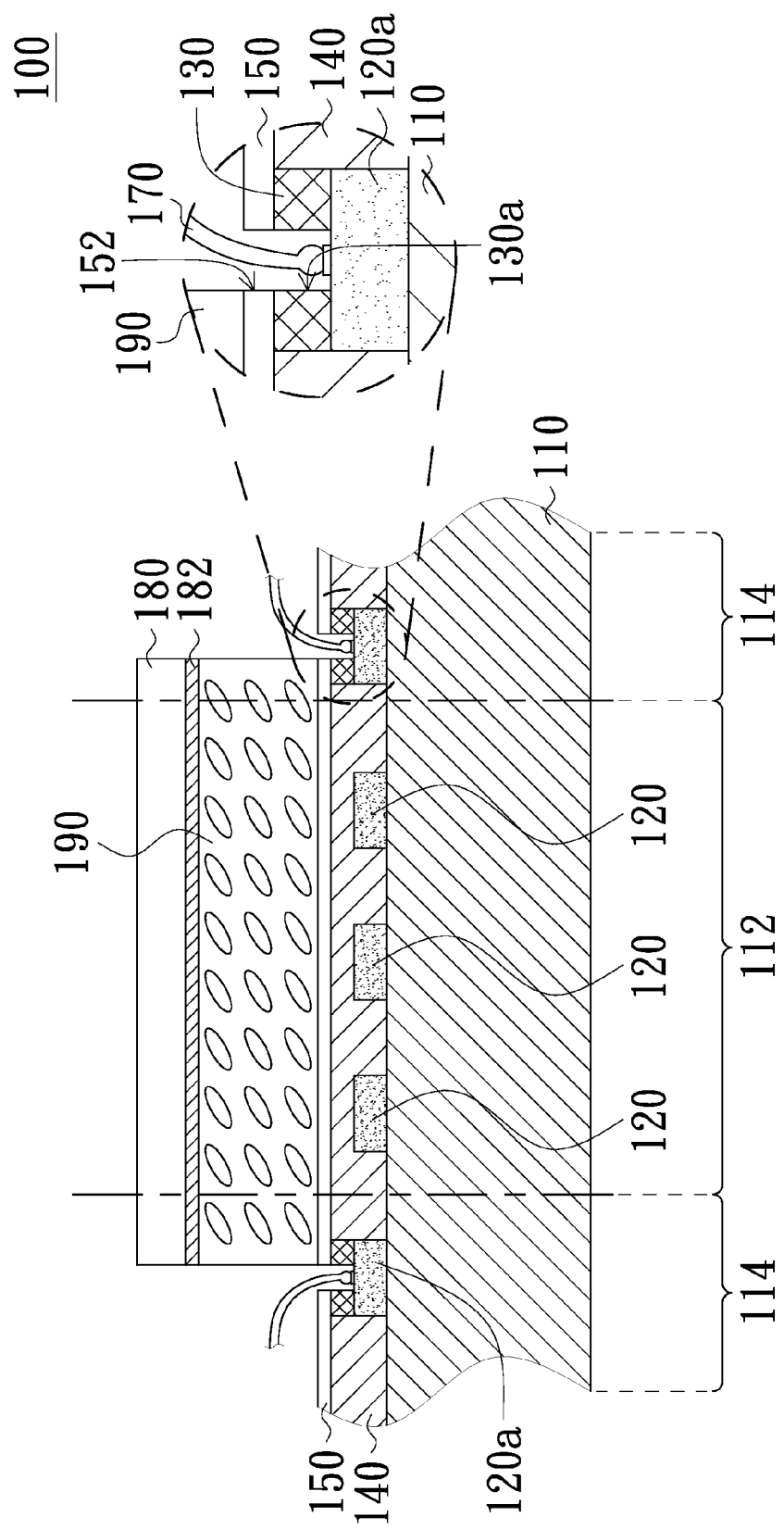
FIG. 1 is a schematic cross-sectional view illustrating a liquid crystal on silicon display panel according to an embodiment of the present invention.

FIG. 1 is a schematic cross-sectional view illustrating a liquid crystal on silicon display panel according to an embodiment of the present invention. Referring to FIG. 1, the liquid crystal on silicon (LCOS) display panel 100 includes a semiconductor substrate 110, at least one first top metal pattern 120, a least one anti-reflection structure 130, a dielectric layer 140, a passivation layer 150, at least one second top metal pattern 120a, a transparent substrate 180 and a liquid crystal layer 190. In this embodiment, the LCOS display panel 100 includes a plurality of first top metal patterns 120 and a plurality of second top metal patterns 120a. Further, the LCOS display panel 100 relatively includes a plurality of anti-reflection structures 130 disposed on the second top metal patterns 120a.

The transparent substrate 180 is disposed above the semiconductor substrate 110, and the liquid crystal layer 190 is disposed between the transparent substrate 180 and semiconductor substrate 110. In detail, a common electrode 182 has been disposed on the transparent substrate 180 and located between the transparent substrate 180 and liquid crystal layer 190. The common electrode 182 is a transparent conductive layer, such as indium tin oxide (ITO) or indium zinc oxide (IZO). The material of the transparent substrate 180 can be glass.

The semiconductor substrate 110 has a pixel region 112 and a circuit region 114 surrounding the pixel region 112. The first top metal patterns 120 and the second top metal patterns 120a are formed on the semiconductor substrate 110 by using the same metal layer. Further, some semiconductor devices and interconnecting structures (not shown) can also be formed on the semiconductor substrate 110. Moreover, the first top metal patterns 120 and the second top metal patterns 120a are formed of the top metal layer of the interconnecting structures and are, for example, respectively connected with the corresponding semiconductor devices through the other conductive layers of the interconnecting structures. Specifically, some CMOS transistors used for driving the liquid crystal on silicon display panel 100 are formed in the pixel region 112 of the semiconductor substrate 110, and the first top metal patterns 120 are electrically connected with the CMOS transistors through the interconnecting structures. That is, the first top metal patterns 120 are, for example, the pixel electrodes of the liquid crystal on silicon display panel 100. Since the liquid crystal on silicon display panel 100 is a reflective display panel, the material of the first top metal patterns 120 may be reflective metal, such as aluminum, but the invention is not limited hereto.

Additionally, a peripheral circuit (not shown) of the liquid crystal on silicon display panel 100 is formed in the circuit region 114 of the semiconductor substrate 110. In this embodiment, the second top metal patterns 120a are a part of the peripheral circuit. Specifically, the second top metal pattern 120a may be the bonding pads formed with the first top metal pattern 120 in the same process and used for electrically connecting the circuit configured inner the semiconductor substrate 110 to the extra circuits.

The anti-reflection structure 130 is disposed on second top metal pattern 120a and has a first opening 130a exposing a portion of the second top metal pattern 120a. It should be noted that the anti-reflection structure 130 of this embodiment is not only can be single-layer structure, such as titanium nitride (TiN), also can be multi-layer structure, such as double-layer like titanium nitride/titanium (TiN/Ti), titanium nitride/silicon oxynitride (TiN/SiON) or silicon dioxide/silicon oxynitride (SiO$_2$/SiON), or triple-layer like titanium nitride/titanium/silicon oxynitride.

The dielectric layer 140 is disposed on semiconductor substrate 110 and covers the first top metal pattern 120. Since there is not any anti-reflection layer formed on the first top metal pattern 120, the dielectric layer 140 is directly contact to the top surface of the first top metal pattern 120. Moreover, the passivation layer 150 is disposed on dielectric layer 140 and has a second opening 152 corresponding to the first opening 130a. In this embodiment, the passivation layer 150 is, for example, a multi-layer composed of an oxide layer and a nitride layer stacked thereon.

Furthermore, a conductive wire 170 is selectively formed within the circuit region 114 to electrically connect with the second top metal pattern 120a by wire bonding through the second opening 152 and the first opening 130a. Accordingly, an extra circuit can be electrically connected with the circuit formed on the semiconductor substrate 110 through the conductive wire 170 and the second top metal pattern 120a.

In this embodiment, the anti-reflection structure 130 is used for reducing the light reflected from the second top metal patterns 120a within the circuit region 114. Therefore, the contrast of the image projected from the LCOS display panel 100 can be improved. Furthermore, among the materials of the anti-reflection structure 130 disclosed in this embodiment, the triple-layer composed of TiN/Ti/SiON has the best anti-reflectivity. Specifically, if the materials of the first top metal pattern 120 and the second top metal pattern 120a are aluminum, the anti-reflection structure 130 composed of TiN/Ti/SiON can reduce the reflectivity of the second top metal pattern 120a about 80%.

A method for manufacturing the aforementioned LCOS display panel would be described in the following paragraphs. FIGS. 2A to 2I are schematic cross-sectional views illustrating a method for manufacturing a portion of a LCOS display panel according to an embodiment of the present invention.

Figure 2A:
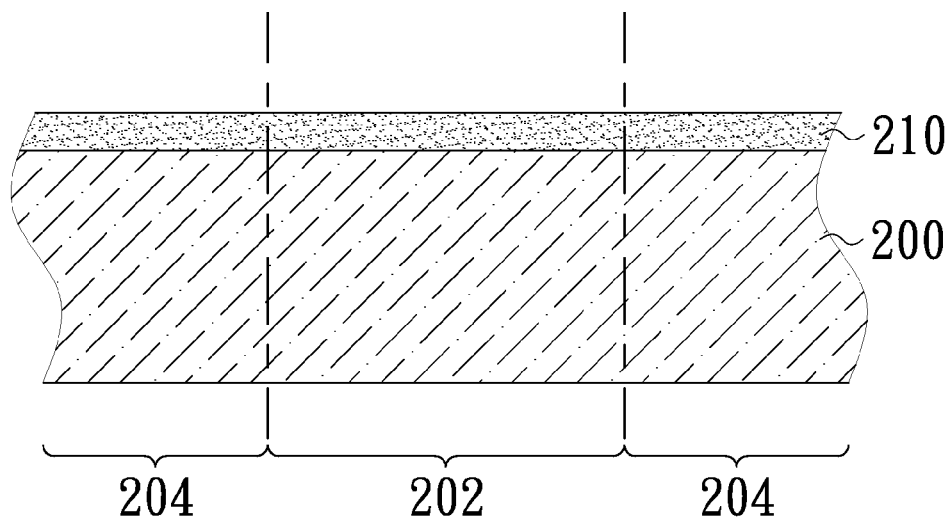
FIGS. 2A to 2I are schematic cross-sectional views illustrating a method for manufacturing a portion of a liquid crystal on silicon display panel according to an embodiment of the present invention.
Figure 2B:
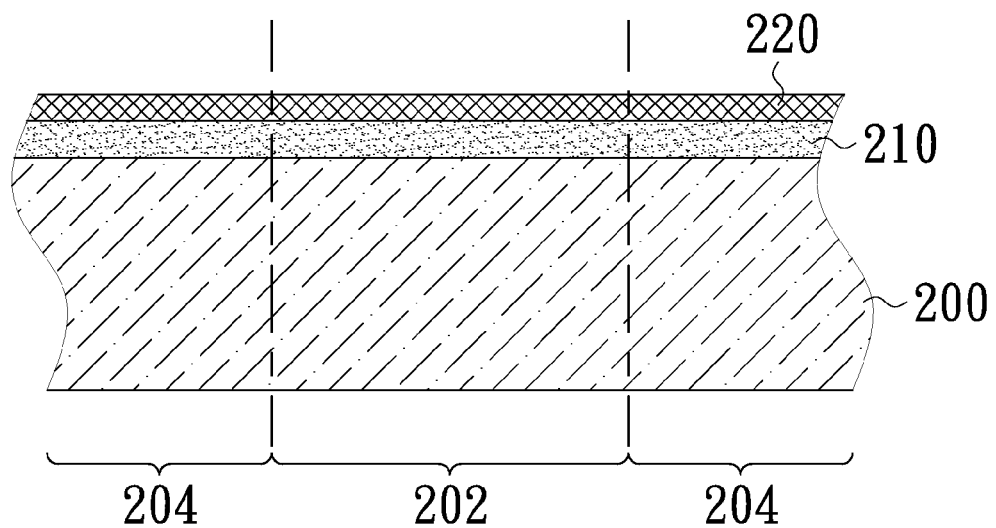

Referring to FIG. 2A and FIG. 2B, a semiconductor substrate 200 with a pixel region 202 and a circuit region 204 is provided firstly. The circuit region 204 surrounds the pixel region 202. Next, a metal layer 210 and an anti-reflection coating layer 220 are sequentially formed on the semiconductor substrate 200. Specifically, the metal layer 210 may be the top metal pattern of an interconnecting structures formed on the semiconductor substrate 200.

Figure 2C:
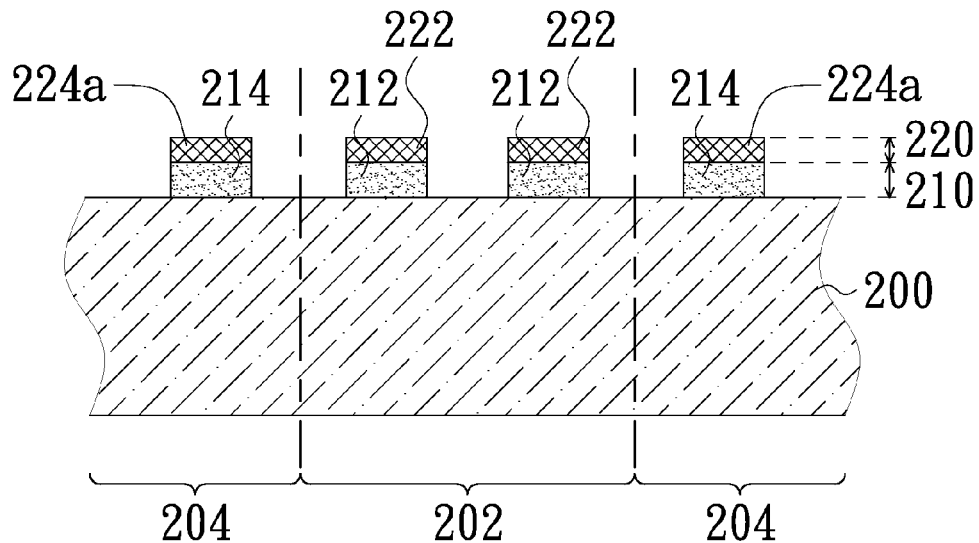

Referring to FIG. 2C, the metal layer 210 and the anti-reflection structure 220 are patterned to form a plurality of first top metal patterns 212 and a plurality of first anti-reflection coating structures 222 in the pixel region 202, and form a plurality of second top metal patterns 214 and a plurality of second anti-reflection coating structure 224a in the circuit region 204. In this embodiment, the material of the first top metal pattern 212 and the second top metal pattern 214 can be reflective metal, such as aluminum. Additionally, some semiconductor devices (such as CMOS transistors) and some interconnecting structures also may have been formed on the semiconductor substrate 200, and the first top metal patterns 212 and the second top metal patterns 214 are electrically connected with the semiconductor devices through the other conductive layers of the interconnecting structures. The detail is described in aforementioned paragraphs.

Figure 2D:
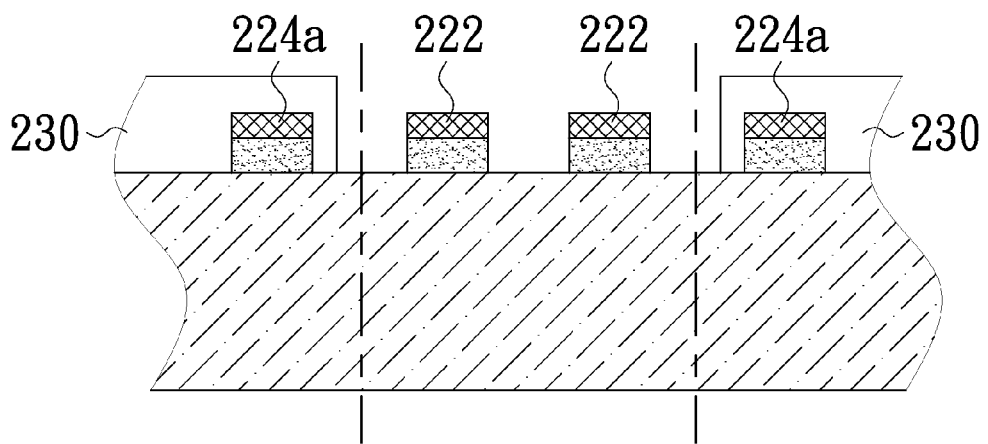
Figure 2E:
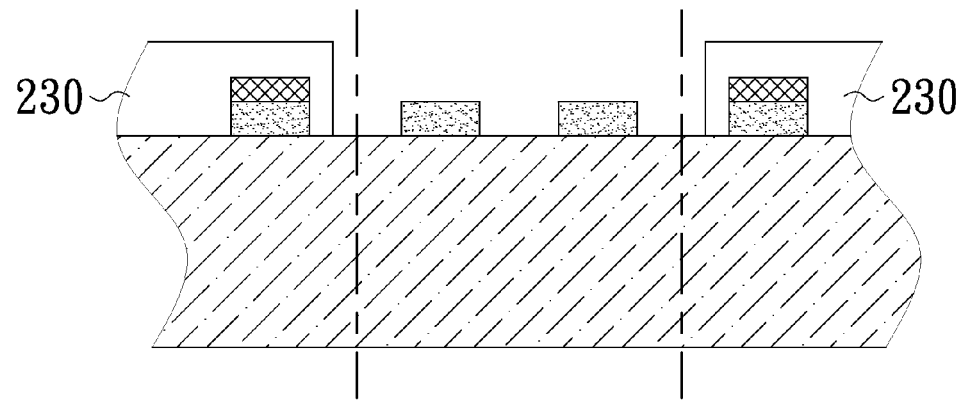
Figure 2F:
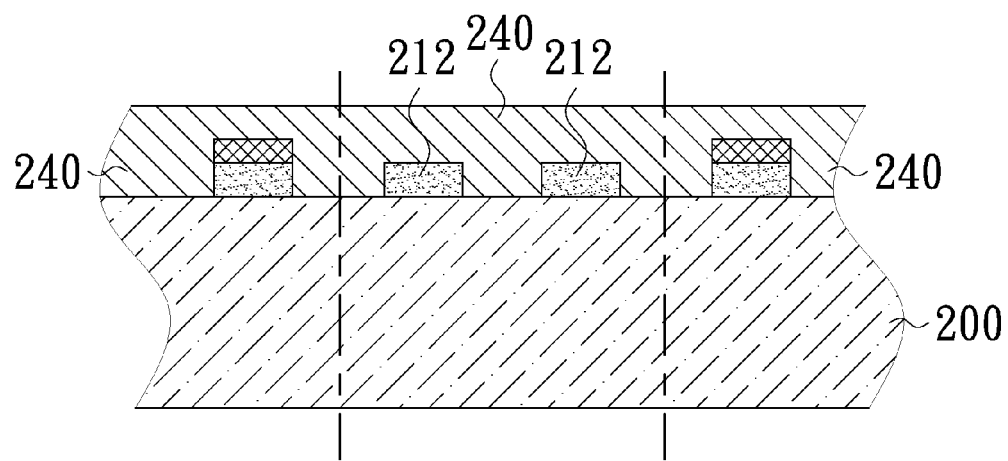

Referring to FIG. 2D to 2F, a first patterned mask layer 230 is formed to cover the second anti-reflection coating structure 224a, and the first anti-reflection coating structures 222 are removed by using the first patterned mask layer 230 as an etching mask. Next, the first patterned mask layer 230 is removed and then a dielectric layer 240 is formed on the semiconductor substrate 200 to cover the first top metal patterns 212.

Figure 2G:
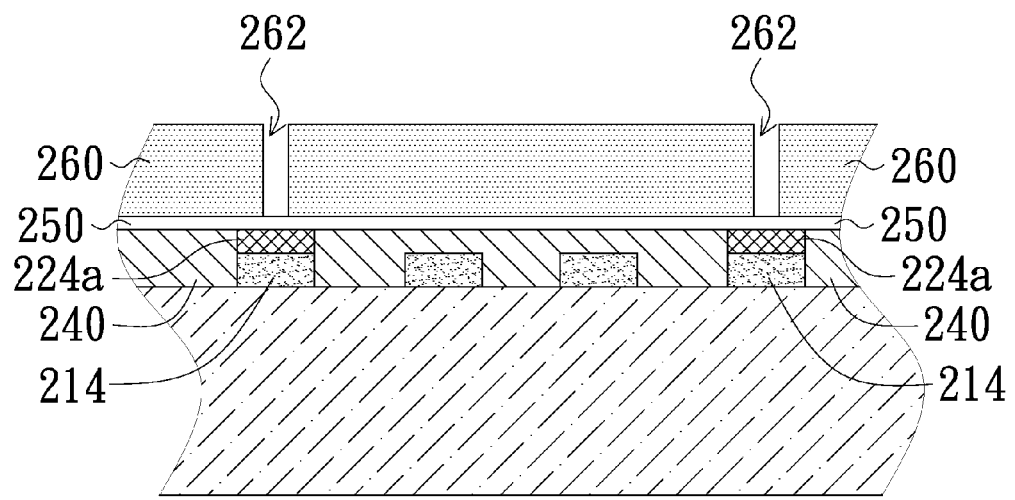

Referring to FIG. 2G, a passivation layer 250 is formed on the dielectric layer 240. In this embodiment, the passivation layer 250 is, for example, a multi-layer composed of an oxide layer and a nitride layer stacked sequentially. Then, a second patterned mask layer 260 with an opening 262 is formed on the passivation layer 250, and the opening 262 is located above the second top metal pattern 214 and exposes a portion of the passivation layer 250.

Figure 2H:
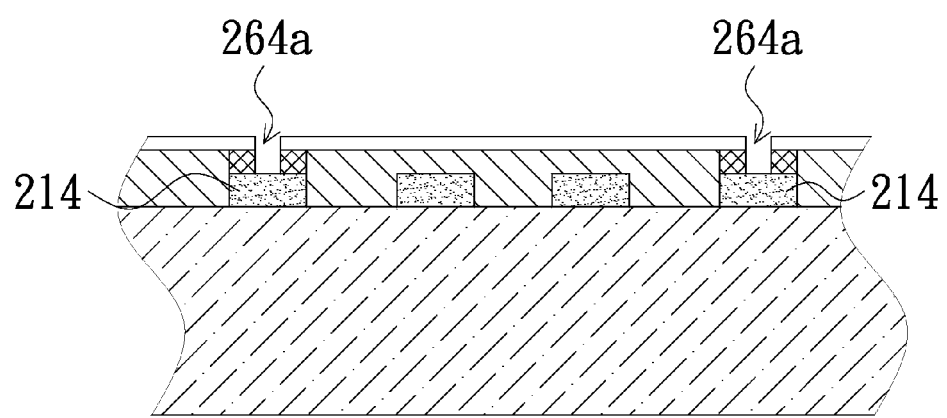

Referring to FIG. 2G and FIG. 2H, the exposed portion of the passivation layer 250 and a portion of the second anti-reflection coating structure 224a thereunder are removed to form an opening 264a exposing a portion of the second top metal pattern 214. Then, the second patterned mask layer 260 is removed. The materials of the second anti-reflection coating structure 224a are similar to or the same with that of the anti-reflection structure 130 shown in FIG. 1.

Figure 2I:
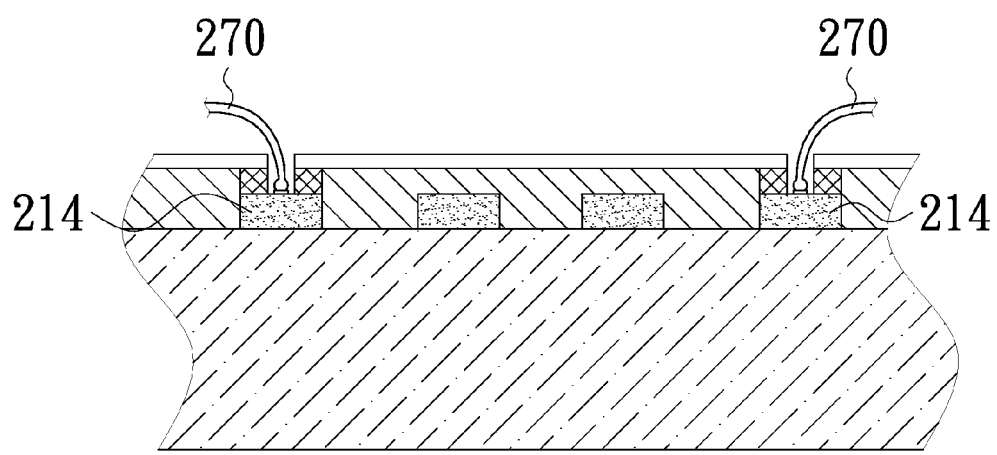

Referring to FIG. 2I, a conductive wire 270 can be formed to electrically connect to the second top metal pattern 214 by wire bonding through the opening 264a. Later, a liquid crystal layer and a transparent substrate would be formed on the passivation layer 250 to produce a LCOS display panel similar to the LCOS display panel 100 shown in FIG. 1.

In summary, for the method for manufacturing a liquid crystal on silicon display panel of the invention, the anti-reflection structure is formed on the second top metal pattern formed in the circuit region for reducing the light reflected from the second top metal pattern within the circuit region. Therefore, the contrast of the image projected from the liquid crystal on silicon display panel can be improved. Moreover, the reflectivity of the circuit region can be reduced further by selecting appropriate materials of the anti-reflection structure.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for manufacturing a liquid crystal on silicon display panel, comprising the steps of:
    providing a semiconductor substrate having a pixel region and a circuit region surrounding the pixel region, the pixel region wherein at least one first top metal pattern and a first anti-reflection coating structure disposed thereon have been formed, the circuit region wherein at least one second top metal pattern and a second anti-reflection coating structure disposed thereon have been formed;
    removing the first anti-reflection coating structure;
    forming a dielectric layer covering the first top metal pattern on the semiconductor substrate;
    forming a passivation layer on the dielectric layer; and
    removing a portion of the passivation layer and a portion of the second anti-reflection coating structure thereunder to form an opening exposing a portion of the second top metal pattern.

2. The method according to claim 1, wherein the material of the first top metal pattern comprises reflective metal.

3. The method according to claim 1, wherein the step of providing a semiconductor substrate having a pixel region and a circuit region comprises:
    forming an metal layer on the semiconductor substrate;
    forming an anti-reflection coating layer on the metal layer; and
    patterning the metal layer and the anti-reflection coating layer to form the first top metal pattern and the first anti-reflection coating structure within the pixel region and form the second top metal pattern and the second anti-reflection coating structure within the circuit region.

4. The method according to claim 1, wherein the second anti-reflection coating structure is single-layer structure or multi-layer structure.

5. The method according to claim 4, wherein the materials of the second anti-reflection coating structure comprise titanium nitride, titanium nitride/titanium, titanium nitride/silicon oxynitride, titanium nitride/titanium/silicon oxynitride or silicon dioxide/silicon oxynitride.

6. The method according to claim 1, further comprising the step of forming at least one conductive wire to electrically connect to the second top metal pattern through the opening.

7. A liquid crystal on silicon display panel, comprising:
    a semiconductor substrate having a pixel region and a circuit region surrounding the pixel region;
    at least one first top metal pattern disposed on the semiconductor substrate and within the pixel region;
    at least one second top metal pattern, disposed on the semiconductor substrate and within the circuit region;
    an anti-reflection coating structure disposed on the second top metal pattern and having a first opening exposing a portion of the second top metal pattern;
    a dielectric layer disposed on the semiconductor substrate and covering the first top metal pattern and directly contacting with the top surface of the first top metal pattern; and
    a passivation layer disposed on the dielectric layer and having a second opening corresponding to the first opening.

8. The liquid crystal on silicon display panel according to claim 7, further comprising:
    a transparent substrate disposed above the semiconductor substrate; and
    a liquid crystal layer disposed between the transparent substrate and the semiconductor substrate.

9. The liquid crystal on silicon display panel according to claim 7, the material of the first top metal pattern comprises reflective metal.

10. The liquid crystal on silicon display panel according to claim 7, wherein the anti-reflection coating structure is single-layer structure or multi-layer structure.

11. The liquid crystal on silicon display panel according to claim 9, wherein the materials of the anti-reflection coating structure comprise titanium nitride, titanium nitride/titanium, titanium nitride/silicon oxynitride, titanium nitride/titanium/silicon oxynitride or silicon dioxide/silicon oxynitride.

12. The liquid crystal on silicon display panel according to claim 7, further comprising at least one conductive wire disposed within the first opening and the second opening and electrically connecting to the second top metal pattern.

* * * * *